US012664526B2

(12) United States Patent
Liang et al.

(10) Patent No.: US 12,664,526 B2
(45) Date of Patent: Jun. 23, 2026

(54) LINEAR PROGRAMMING-BASED DYNAMIC BLENDING MODEL

(71) Applicant: Microsoft Technology Licensing, LLC, Redmond, WA (US)

(72) Inventors: Keqing Liang, Cupertino, CA (US); Konstantin Salomatin, San Francisco, CA (US); Noureddine El Karoui, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 640 days.

(21) Appl. No.: 17/952,095

(22) Filed: Sep. 23, 2022

(65) Prior Publication Data
US 2024/0112281 A1 Apr. 4, 2024

(51) Int. Cl.
*G06Q 10/40* (2026.01)
*G06Q 30/0201* (2023.01)

(52) U.S. Cl.
CPC ......... *G06Q 10/40* (2026.01); *G06Q 30/0201* (2013.01)

(58) Field of Classification Search
CPC ........................... G06Q 50/01; G06Q 30/0201
USPC ........................................................ 705/319
See application file for complete search history.

(56) References Cited

U.S. PATENT DOCUMENTS

| | | | |
|---|---|---|---|
| 10,387,910 B2 | 8/2019 | Gao et al. | |
| 10,565,622 B1 | 2/2020 | Burstein et al. | |
| 10,679,304 B2 * | 6/2020 | Pei | G06Q 10/40 |
| 10,839,100 B2 | 11/2020 | Hollinger et al. | |
| 10,922,722 B2 | 2/2021 | Cetintas et al. | |
| 10,951,676 B2 | 3/2021 | Yan et al. | |
| 11,514,125 B1 * | 11/2022 | Momma | G06N 20/20 |
| 2011/0153421 A1 | 6/2011 | Novikov et al. | |
| 2014/0101685 A1 | 4/2014 | Kitts et al. | |
| 2015/0095154 A1 * | 4/2015 | Kannan | G06Q 50/01 |
| | | | 705/14.55 |
| 2016/0224683 A1 * | 8/2016 | Hicks | G06F 16/211 |
| 2016/0358229 A1 | 12/2016 | Bhalgat et al. | |
| 2018/0121047 A1 * | 5/2018 | Goel | G06F 3/0485 |

(Continued)

OTHER PUBLICATIONS

Tong Geng et al., "Automated Bidding and Budget Optimization for Performance Advertising Campaigns", SSRN, Aug. 22, 2021, Retrieved from https://papers.ssrn.com/sol3/papers.cfm?abstract_id=3913039 (Year: 2021).*

(Continued)

*Primary Examiner* — Jessica Lemieux
*Assistant Examiner* — Joshua D Schneider
(74) *Attorney, Agent, or Firm* — KDW Firm PLLC

(57) ABSTRACT

In an example embodiment, a blending model is presented based on a linear programming approach. The blending model produces a slate of sponsored and non-sponsored pieces of content for display in a graphical user interface, with the ordering and placement of the sponsored and non-sponsored pieces of content selected in order to maximize an objective function. Such an approach can fine tune each piece of content using content-level parameters and holistically examine global constraints and opportunities. It establishes a robust optimization framework that can adapt to content and domain changes without requiring tuning through online experiments.

19 Claims, 7 Drawing Sheets

(56)    References Cited

U.S. PATENT DOCUMENTS

| | | |
|---|---|---|
| 2018/0300335 A1 | 10/2018 | Drochomirecki et al. |
| 2019/0043017 A1 | 2/2019 | Grover et al. |
| 2019/0102806 A1* | 4/2019 | Doshi .................. H04N 21/812 |
| 2019/0139096 A1* | 5/2019 | Chen .................. G06Q 30/0275 |
| 2019/0147041 A1 | 5/2019 | Dey et al. |
| 2019/0197398 A1 | 6/2019 | Jamali et al. |
| 2020/0065772 A1 | 2/2020 | Whitehead et al. |
| 2020/0302477 A1 | 9/2020 | Liang |
| 2021/0097126 A1 | 4/2021 | Martini et al. |
| 2021/0382952 A1 | 12/2021 | Yates |
| 2023/0095289 A1 | 3/2023 | Liang et al. |
| 2023/0109298 A1* | 4/2023 | Arnold ............... G06Q 30/0627 |
| | | 705/27.2 |

OTHER PUBLICATIONS

"Notice of Allowance Issued in U.S. Appl. No. 17/486,577", Mailed Date: Jun. 30, 2023, 16 Pages.

"Corrected Notice of Allowability Issued in U.S. Appl. No. 17/486,577", Mailed Date: Jul. 24, 2023, 12 Pages.

"Non Final Office Action Issued in U.S. Appl. No. 17/486,577", Mailed Date: Mar. 13, 2023, 39 Pages.

"Notice of Allowance Issued in U.S. Appl. No. 16/588,485", Mailed Date: Sep. 15, 2021, 12 Pages.

"Non-Final Office Action Issued in U.S. Appl. No. 16/588,485", Mailed Date: Apr. 21, 2021, 17 Pages.

Notice of Allowance mailed on Aug. 17, 2023, in U.S. Appl. No. 17/486,577, 12 pages.

* cited by examiner

500

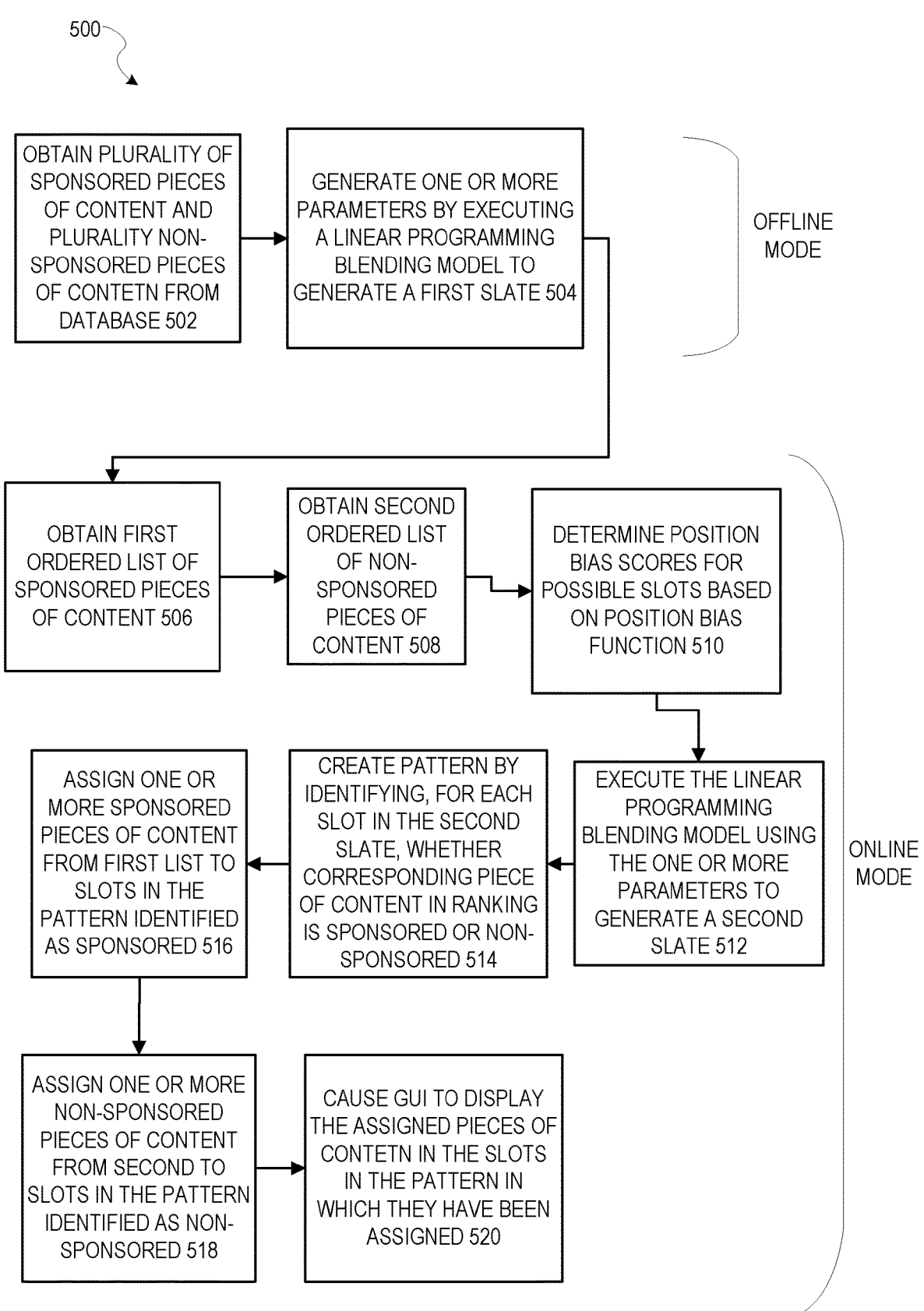

OBTAIN PLURALITY OF SPONSORED PIECES OF CONTENT AND PLURALITY NON-SPONSORED PIECES OF CONTETN FROM DATABASE 502

GENERATE ONE OR MORE PARAMETERS BY EXECUTING A LINEAR PROGRAMMING BLENDING MODEL TO GENERATE A FIRST SLATE 504

OFFLINE MODE

OBTAIN FIRST ORDERED LIST OF SPONSORED PIECES OF CONTENT 506

OBTAIN SECOND ORDERED LIST OF NON-SPONSORED PIECES OF CONTENT 508

DETERMINE POSITION BIAS SCORES FOR POSSIBLE SLOTS BASED ON POSITION BIAS FUNCTION 510

ASSIGN ONE OR MORE SPONSORED PIECES OF CONTENT FROM FIRST LIST TO SLOTS IN THE PATTERN IDENTIFIED AS SPONSORED 516

CREATE PATTERN BY IDENTIFYING, FOR EACH SLOT IN THE SECOND SLATE, WHETHER CORRESPONDING PIECE OF CONTENT IN RANKING IS SPONSORED OR NON-SPONSORED 514

EXECUTE THE LINEAR PROGRAMMING BLENDING MODEL USING THE ONE OR MORE PARAMETERS TO GENERATE A SECOND SLATE 512

ONLINE MODE

ASSIGN ONE OR MORE NON-SPONSORED PIECES OF CONTENT FROM SECOND TO SLOTS IN THE PATTERN IDENTIFIED AS NON-SPONSORED 518

CAUSE GUI TO DISPLAY THE ASSIGNED PIECES OF CONTETN IN THE SLOTS IN THE PATTERN IN WHICH THEY HAVE BEEN ASSIGNED 520

*FIG. 5*

LINEAR PROGRAMMING-BASED DYNAMIC BLENDING MODEL

TECHNICAL FIELD

The present disclosure generally relates to technical problems encountered in machine learning. More specifically, the present disclosure relates to a linear programming-based dynamic blending model.

BACKGROUND

The rise of the Internet has occasioned two disparate yet related phenomena: the increase in the presence of online networks, such as social networking services, with their corresponding user profiles visible to large numbers of people, and the increase in the use of these online networking services to provide content. An example of such content is job listing content. Here, job listings are posted to a social networking service and these job listings are presented to users of the social networking service, either as results of job searches performed by the users in the social networking service, or as unsolicited content presented to users in various other channels of the social networking service.

The online network typically will charge the entities that post certain types of content, such as job listings (e.g., companies, recruiting firms, etc.), a fee for posting the content and for having the content displayed in a more prominent position (e.g., higher in a list) than it would have been displayed if no fee had been charged. In some circumstances the charge for the content is an ongoing fee based on the number of users who view the content. More particularly, in some circumstances it is beneficial to allow companies to pay for "sponsored" content, which is surfaced to users in contexts within the graphical user interfaces of the online network in which it would not have ordinarily been seen, and to mix these sponsored pieces of content with non-sponsored pieces of content (also called "organic" content). It should be noted that while non-sponsored pieces of content may commonly be "free," in that the poster is not charged for either posting the content or for displaying the content more prominently, it is possible for a piece of content to be non-sponsored while there still being a fee involved, such as if a fee is charged for every job listing that is posted (e.g., all organic pieces of content have fees) and job posters may elect to pay an additional fee to sponsor the piece of content in order to display the content more prominently.

Coordinating displaying the sponsored pieces of content within the organic pieces of content can create numerous technical challenges with respect to how and how often the sponsored pieces of content should be displayed.

One solution is to provide fixed slotting. In fixed slotting, the portion of a user interface designed to display the pieces of content is split into various fixed slots. Some of the slots are assigned to sponsored pieces of content and some of the slots are assigned to organic pieces of content. For example, for a user interface with 15 possible slots in which to display pieces of content, the first three may be set aside specifically for sponsored pieces of content, the next eight may be set aside specifically for organic pieces of content, and the last four may be set aside specifically for sponsored pieces of content.

Such a fixed approach, however, is suboptimal. Different users have different reactions to the presentation of sponsored pieces of content as well as to where the sponsored pieces of content are presented. One user may respond well to having a sponsored piece of content in a first slot while another user may respond poorly, but may respond well if the sponsored piece of content was in the middle of the slots. Additionally, depending on the pieces of content involved, there may be circumstances where the number of sponsored pieces of content that the user is likely to engage with is low. In such cases, it may be more beneficial to devote more slots to organic pieces of content that the user is likely to engage with rather than fill fixed slots with sponsored pieces of content that the user is unlikely to engage with.

BRIEF DESCRIPTION OF THE DRAWINGS

Some embodiments of the technology are illustrated, by way of example and not limitation, in the figures of the accompanying drawings.

FIG. 5 is a flow diagram illustrating a method of displaying pieces of content in a graphical user interface, in accordance with an example embodiment.

DETAILED DESCRIPTION

Overview

Figure 1:
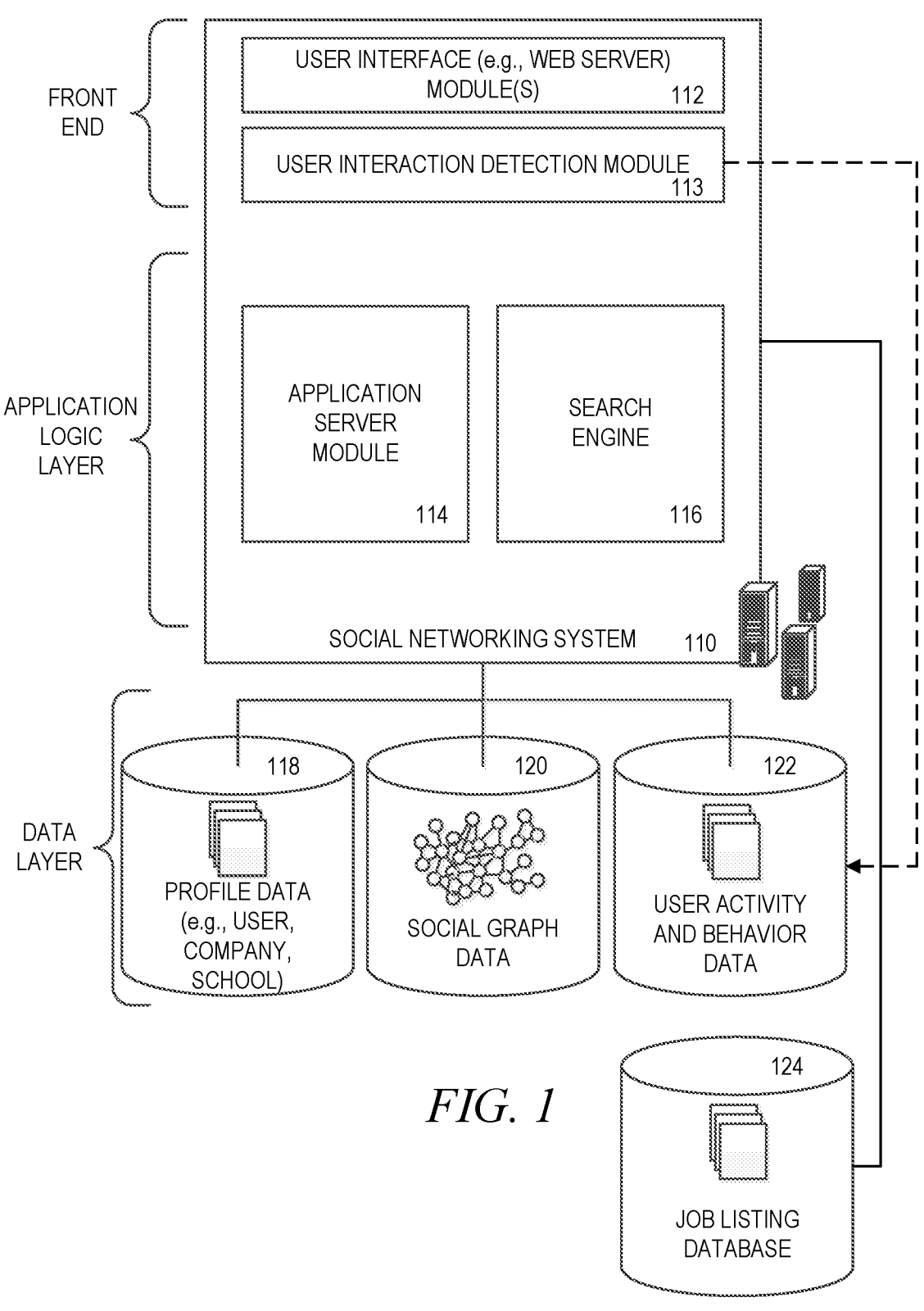
FIG. 1 is a block diagram showing the functional components of a social networking service, including a data processing module referred to herein as a search engine, for use in generating and providing search results for a search query, consistent with some embodiments of the present disclosure.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a blending model is presented based on a linear programming approach. The blending model produces a slate of sponsored and non-sponsored pieces of content for display in a graphical user interface, with the ordering and placement of the sponsored and non-sponsored pieces of content selected in order to maximize an objective function. Such an approach can fine tune each piece of content using content-level parameters and holistically examine global constraints and opportunities. It establishes a robust optimization framework that can adapt to content and domain changes without requiring tuning through online experiments.

More particularly, for sponsored listings, a linear programming blending model runs offline periodically (e.g., once a day) to generate parameters for a model that will run at runtime to determine slotting for actual pieces of content being considered at runtime. The linear programming blending model is optimized to maximize a first metric, while maintaining one or more constraints as guardrails. Guardrails in this context mean metrics whose values should stay withing a predetermined range in whatever solution is determined to be the maximal solution for the first metric. For example, as will be described in more detail below, the first metric may be the proportion of chargeable views for the pieces of content. Specifically, for sponsored pieces of content, an online network may charge for each view of the piece of content, and thus the linear programming blending model attempts to optimize the slotting of the sponsored pieces of content (which will be mixed in with organic pieces of content) to maximize the proportion of views of pieces of content that are sponsored, but at the same time attempt to optimize the slotting in such a way that certain guardrails are maintained; in other words, that metrics such as total revenue, budget constraints for individual pieces of content, and overall views, do not drop from where they were prior to the optimization of the slotting.

The parameters learned during the offline execution of the model are then utilized at runtime to identify an optimal blending of sponsored and non-sponsored pieces of content. Furthermore, the model incorporates position bias into its analysis. Position bias is the phenomenon where higher positioned pieces of content are more likely to be seen and thus interacted with, regardless of their actual relevance. This results in lower engagement on lower-ranked pieces of content.

Both the sponsored and non-sponsored pieces of content are ranked using their owned respective relevance models. Thus, the sponsored pieces of content being considered for display are run through a sponsored relevance model, which produces a relevance score for each sponsored piece of content being considered for display, and each of these sponsored pieces of content are then ranked based on their respective relevance scores, with most relevant being higher in the ranking. Likewise, the non-sponsored pieces of content being considered for display are run through a non-sponsored relevance model, which produces a relevance score for each non-sponsored piece of content being considered for display, and each of these non-sponsored pieces of content are then ranked based on their respective relevance scores, with most relevant being higher in the ranking. Neither of these rankings is modified by the linear programming model, which is designed not to alter which pieces of content are considered most relevant within their respective groupings but instead determining whether, at each slot in a slate of slots where content can be displayed, a sponsored or a non-sponsored piece of content should be displayed.

The linear programming model computes, at runtime, the cumulative sums of metrics of the sponsored and non-sponsored pieces of content lists and then iterates over all possible breakdowns among slots, using the parameters learned during the offline mode and the position bias. The result is a slate of slots that meets all the constraints and optimizes on the objective function. This slate is the pattern for which slots are assigned to either sponsored or non-sponsored pieces of content. Thus, for example, if there are 15 slots in a user interface to display pieces of content, and the top 15 results in the slate are such that the first 3 pieces of content are non-sponsored, the next 2 pieces of content are sponsored, the next 3 pieces of content are non-sponsored, the next piece of content is sponsored, the next 2 pieces of content are non-sponsored, the next 2 pieces of content are sponsored, and the final piece of content is non-sponsored. Then the pattern would be 3 non-sponsored, 2 sponsored, 3 non-sponsored, 1 sponsored, 2 non-sponsored, 2 sponsored, 1 non-sponsored.

This pattern only determines the slot assignments. The actual ranking of the pieces of content, and more particularly the actual ranking of the organic pieces of content, is determined by an ordering other than the ranking determined by the blending model, such as by using the respective rankings determined by the sponsored relevance model and the non-sponsored relevance model. The pieces of content are then displayed in the order of this actual ranking, but in the slots indicated as having been assigned to be either sponsored or non-sponsored in the pattern determined by the blending model.

DESCRIPTION

The disclosed embodiments provide a method, apparatus, and system for performing dynamic slotting of content impressions, and specifically dynamically determining a pattern for the slotting using a blending model, and then separately determining an order for display within the pattern using something other than the blending model. It should be noted that for ease of understanding, a particular type of content, specifically job listings, will be described in detail in this disclosure. Nothing in this disclosure shall be read, however, as specifically limiting implementation of the techniques described herein to job listings, and the claims shall not be interpreted as being limited to job listings unless explicitly stated.

One possible solution to the problems that occur with the fixed approach to slotting of listings is to display listings in accordance with a blending model that is used to first identify a pattern of slots to which to assign either sponsored or organic pieces of content. This blending model is applied to a combination of both sponsored and organic pieces of content being considered for display to a user. Thus, for example, a first list of sponsored pieces of content to display and a second list of organic pieces of content to display are received. Each of these lists may be ordered in accordance with some earlier-applied ranking model.

The lists may be merged into a single merged list, and any duplicates may then be removed. The merged list may then be ranked using the blending model. The blending model may utilize a predicted click-through rate (or other measure of engagement) for each piece of content, as determined by an engagement model. This predicted click-through rate may then be multiplied by a bid. In the case of sponsored pieces of content, the bid may reflect the value the sponsor is agreeing to provide in exchange for a single impression of the corresponding sponsored piece of content.

The blending model may also apply one or more constraints to the pattern it is determining. Effectively, the blending model ranks the pieces of content (including both sponsored and organic pieces of content) using the click-through rate and bid, but conditions the ranking on the one or more constraints being met. Thus, the ranking from using the click-through rate and bid is modified to meet the constraints.

A technical problem, however, is encountered with such a blending model. Specifically, such a blending model relies solely on historical data, and particularly pieces of content presented previously and the bids for such pieces of content. In other words, such a blending model does not take into account the specific piece of content that is being considered for presentation at runtime, but instead creates the various slot positions using solely past historical information about previously presented pieces of content, regardless of whether those previously presented pieces of content are similar to the specific piece of content being considered.

Thus, in an example embodiment, a linear programming model is presented based on a linear programming approach. The linear programming model produces a slate of sponsored and non-sponsored pieces of content for display in a graphical user interface, with the ordering and placement of the sponsored and non-sponsored pieces of content selected in order to maximize an objective function. Such an approach can fine tune each piece of content using content-level parameters and holistically examine global constraints and opportunities. It establishes a robust optimization framework that can adapt to content and domain changes without requiring tuning through online experiments.

In an example embodiment, sponsored pieces of content are posted within an online network such as a social networking service. Each sponsored piece of content is associated with a daily and/or other time-based budget that is spent as users are provided with impressions of the piece of content. An impression may be considered to be a display of the sponsored piece of content in a manner that causes a charge to be incurred. In an example embodiment, displaying a sponsored piece of content in a list of pieces of content is considered to be an impression, while subsequent interactions the user has with the sponsored piece of content are called "interactions". In the case of job listings, these subsequent interactions may include clicking on the job listing to view the job listing in more detail, applying to the job listing, and/or performing other actions related to the job listing. As a result, prices for sponsored pieces of content may be dynamically adjusted so that a daily budget, set by an entity posting the sponsored piece of content, can be consumed over the course of the day instead of running out too early and/or failing to be used up by the end of the day. Additionally, prices for sponsored content impressions may also be dynamically adjusted to improve application rates, applicant quality, and/or other performance factors related to the sponsored pieces of content.

The poster of a sponsored piece of content may set daily budgets for the sponsored content, from which costs are deducted as the users view the pieces of content.

The price for each impression of a sponsored piece of content is known as the bid. While this bid may be adjusted based on numerous factors, the blending model uses the finalized bid in determining a pattern for dynamic slotting for a particular user and/or device. For organic pieces of content, these items do not have a bid in a traditional sense as no entity is paying specifically for displaying an impression of the corresponding piece of content, and thus a shadow bid is assigned by the social networking system to these organic pieces of content. Details of how the shadow bid is assigned are discussed later in this document.

The resultant slate determined by the linear programming blending model is used as a pattern of distribution of slots, and more particularly in determining whether to assign a slot to a sponsored piece of content or a non-sponsored piece of content. Notably, the actual selection of which sponsored or non-sponsored pieces of content to display in each slot may not be in any way related to the parameters calculated by the linear programming blending model, or any other aspect of the linear programming blending model. Rather, the selection of which sponsored or non-sponsored piece of content to display in each slot may be determined by separate ranking models, such as a sponsored relevance model and a non-sponsored relevance model. In other words, the linear programming blending model determines the pattern of slots, namely what type of piece of content (e.g., sponsored or non-sponsored) will be displayed at each slot, but does not determine the actual pieces of content that are displayed in those slots. Indeed, it is quite possible, for example, for the linear programming blending model to determine that a first slot should be filled with a sponsored piece of content, despite the fact that the highest ranked non-sponsored piece of content has more relevance than the highest ranked sponsored piece of content.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based API requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by the search engine 116 to determine search results for a search query.

Although not shown, in some embodiments, the social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

As described above, example embodiments may be utilized for ranking and/or selection of job listings. These job listings may be posted by job poster (entities that perform the posting, such as businesses) and stored in job listing database 124.

Figure 2:
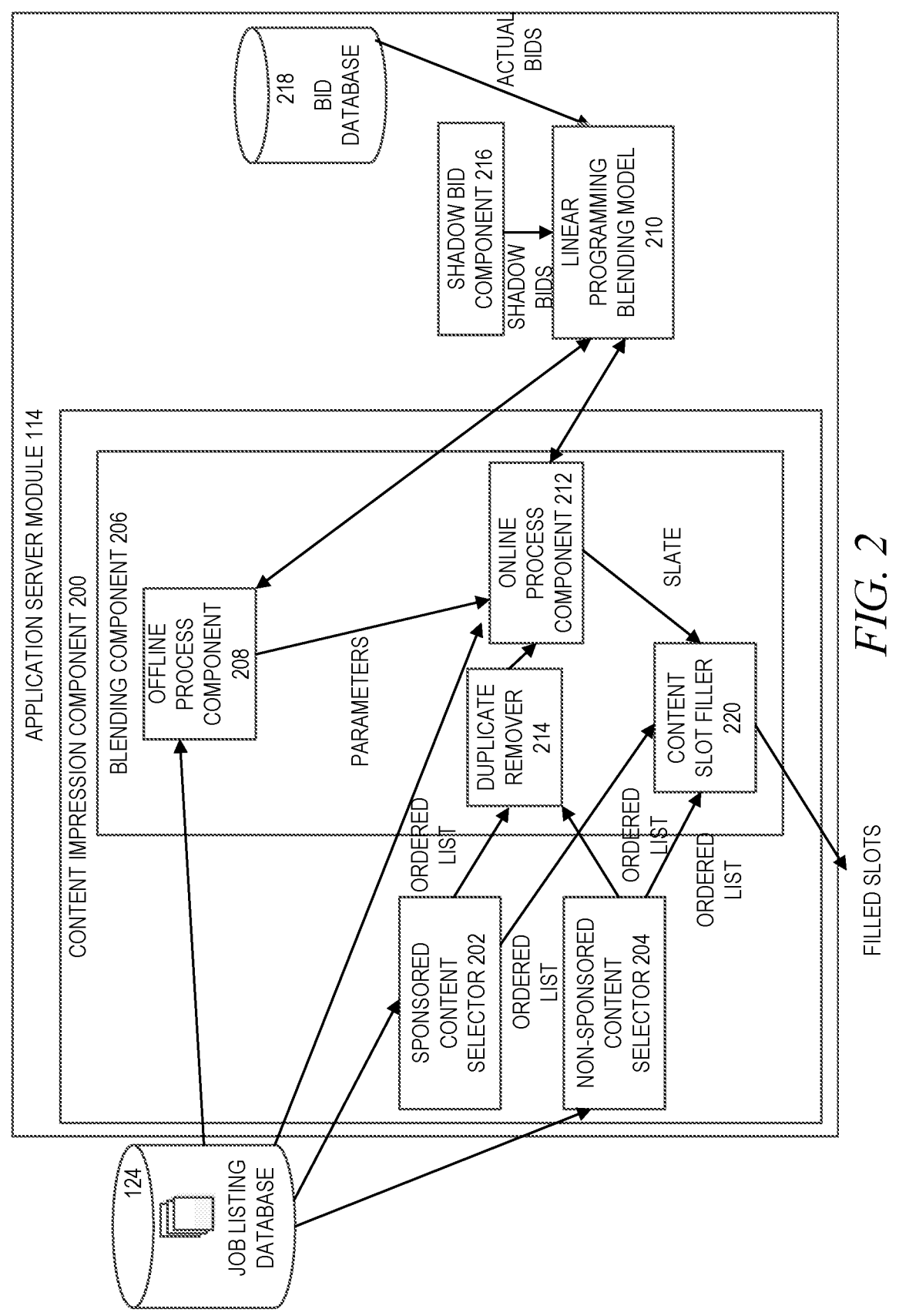
FIG. 2 is a block diagram illustrating an application server module of FIG. 1 in more detail, in accordance with an example embodiment.

FIG. 2 is a block diagram illustrating the application server module 114 of FIG. 1 in more detail, in accordance with an example embodiment. While in many embodiments the application server module 114 will contain many subcomponents used to perform various different actions within the social networking system 110, in FIG. 2 only those components that are relevant to the present disclosure are depicted.

A content impression component 200 may receive, at runtime, one or more job listings from job listing database 124 and determine which users of the online network to present the job listings to as "impressions". An impression is a single display of the job listing in a graphical user interface. There may be numerous ways these impressions may be presented and numerous channels on which these impressions may be presented. For example, the impressions may be presented in an email to a user, in a feed of the online network, or as results of a job search. Some of these impressions may be for job listings where the corresponding entity that posted the job listing has agreed to pay for the impression. Such impressions are called "sponsored impressions". It should be noted that there is a distinction between the corresponding entity having agreed to pay for the impression and the corresponding entity actually paying for the impression. It is possible that the entity may have agreed to pay for an impression but, at the time the impression is made, the daily budget established by the entity has been used up, and thus it becomes possible for the sponsored impression to be displayed without an actual charge being applied to the entity's account.

More particularly, companies may establish a daily budget they want to spend and a cost per impression based on a predicted number of impressions that they believe will occur each day. The actual display of the job listings, however, are based on a variety of factors that may vary based on the individual sets of users potentially served the job listing on a particular day.

All of these determinations may be considered by a sponsored content selector 202, which may consider information about the current user (i.e., the user for whom the piece(s) of content are being considered for display), the channel in which the display may occur, and the content itself (such as how closely features of the content match attributes of the user, or what the user is searching for (e.g., a search query submitted by the user)) to identify an ordered list of sponsored pieces of content available for display to the user in the channel. In this context, "channel" refers to a type of user interface or portion of a user interface on which content may be displayed. For example, a social networking service may provide multiple user interfaces or portions of user interfaces where job listings may be displayed to a user, including a job search channel (where users perform explicit searches for job listings, such as by specifying a job search query), a jobs-you-may-be-interested-in channel (where job listings are presented to a user who has not performed an explicit search, based on information the social networking service knows about the user), an email channel (where job listings are presented in emails rather than as part of a web-based user interface), and a feed channel (where job listings are presented as part of a content feed), where other types of feed content, such as news articles and updates about the user's connections, are intermingled.

In an example embodiment, the sponsored content selector 202 implements a sponsored relevance model that determines the ordered list of sponsored pieces of content, possibly from the features described above. In some example embodiments, this model may be a machine learned model that is trained by a machine learning algorithm. The training may include using training data, such as labeled pieces of content, to learn one or more weights assigned to each of one or more features, such as user features, content features, and channel features. In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, the model implemented by the sponsored content selector 202 bases its selection on a combination of the relevance of the sponsored pieces of content to the user and/or the search performed by the user and how efficiently displaying each of the sponsored pieces of content will utilize the budgets set for the sponsored pieces of content by the job posters.

Regardless of how it is determined, the sponsored content selector 202 outputs an ordered list of sponsored pieces of content.

Separately, a non-sponsored content selector 204 identifies an ordered list of organic pieces of content available for display to the user in the channel. This may be performed using, for example, information about the current user, the channel in which the display may occur, and the content itself (such as how closely features of the content match attributes of the user, or what the user is searching for (e.g., a search query submitted by the user). The non-sponsored pieces of content may be pieces of content posted by job posters who have not elected to sponsor the pieces of content.

In an example embodiment, the non-sponsored content selector 204 implements a non-sponsored relevance model that determines the ordered list of non-sponsored pieces of content, possibly from the features described above. In some example embodiments, this model may be a machine learned model that is trained by a machine learning algorithm. The training may include using training data, such as labeled pieces of content, to learn one or more weights assigned to each of one or more features, such as user features, content features, and channel features. In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method. In an example embodiment, the model implemented by the non-sponsored content selector 204 bases its selection on the relevance of the organic pieces of content to the user and/or the search performed by the user.

The ordered list of sponsored pieces of content and the ordered list of non-sponsored pieces of content are then passed to a blending component 206. However, prior to the online actions of the sponsored content selector 202 and the non-sponsored content selector 204, an offline process component 208 performs calculations that generate parameters using a linear programming blending model 210. The offline process component 208 may execute offline on a periodic basis, such as once a day, utilizing job listings from the job listing database, calculating parameters on those job listings.

During online processing, the parameters from the offline process component 208 may be utilized by an online process component 212. Prior to the parameters being utilized by the online process component, however, the ordered lists from the sponsored content selector 202 and non-sponsored content selector 204 may be passed to a duplicate remover 214, which can remove any duplicates among the lists. Unlike pure advertisements, sponsored pieces of content only vary from sponsored pieces of content by virtue of their respective poster being willing to pay for an impression. Thus, it is possible for a single piece of content, such as a job listing, to be both sponsored and sponsored. This situation can arise, for example, if a company is willing to pay a social networking service to have an impression of the job posting be displayed in results on the social network service, but where the company has also posted the same job posting on a third-party website which is crawled by the social networking service to obtain job listings which are unpaid. In an example embodiment, if the same piece of content exists in both the ordered list of sponsored pieces of content and the ordered list of non-sponsored pieces of content, the duplicate remover 214 removes that piece of content from the ordered list of non-sponsored pieces of content. In another example embodiment, if the same piece of content exists in both the ordered list of sponsored pieces of content and the ordered list of non-sponsored pieces of content, the lower ranked piece of content is removed. This latter example embodiment may involve the duplicate remover 214 being contained within the content slot filler 220, as the de-duplication would occur during the slotting of specific jobs to the slotting pattern, dropping any jobs that were already seen and slotted earlier, to arrive at the final output.

The online process component 212 then evaluates different combinations of pieces of content from the ordered list from the sponsored content selector 202 and pieces of content from the ordered list from the non-sponsored content selector 204 (with duplicates removed by the duplicate remover 214). This evaluation will be based on the parameters generated by the offline process component 208, as well as a position bias. In an example embodiment, additional information may be utilized by the online process component 212 that may not have been known at the time the offline process component 208 was used to generate the parameters, such as details about the user to which the pieces of content are being considered to be displayed. It is also possible that one or more pieces of information about one or more of the sponsored or non-sponsored pieces of content may have been updated since the time the offline process component 208 performed its offline process, and thus the job listings being considered may be retrieved by the online process component 212 from the job listing database 124 despite them already previously having been retrieved by the offline process component 208.

Both the offline process component 208 and the online process component 212 utilize the linear programming blending model 210 to perform their various calculations. The linear programming blending model 210 will be described in more detail later, but generally utilizes several different inputs to perform its calculations. One of these inputs may include "bids" for each piece of content.

In the case of a sponsored piece of content, the bid is the value for the impression of the sponsored piece of content that the poster of the sponsored piece of content is willing to pay (as discussed above it is possible that in certain scenarios the job poster is willing to pay a particular amount but the actual impression itself will wind up costing the job poster less, or even nothing, if, for example, the daily budget has already been exceeded). In the case of a non-sponsored piece of content, the bid is a shadow bid, which is a hypothetical value assigned to the non-sponsored piece of content. In an example embodiment the value of the shadow bid indicates a value of user engagement generally with the pieces of content in the user interface, such as the value to a social networking service operating the content impression component 200. This value may be reflective of an actual monetary value of such engagement with organic pieces of content, such as by advertisements placed elsewhere in the user interface (i.e., outside of the sponsored pieces of content), or may be reflective of an assumed monetary value of more nebulous value drivers, such as increases in subscriptions, or the driving of additional sponsored listings to the system.

In some example embodiments, the shadow bid is determined by a machine-learned model that is trained by a machine learning algorithm to output a value for the corresponding piece of content based on various factors. The machine learned model is trained by a machine learning algorithm. The training may include using training data, such as labeled pieces of content, to learn one or more weights assigned to each of one or more features, such as user features, content features, and channel features. In an example embodiment, the machine learning algorithm may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

In some example embodiments, the shadow bid may be personalized. Users may react differently to sponsored slots. Some users engage more with sponsored slots, and others with non-sponsored slots. Some users consider sponsored slots to be ads to be ignored, while others consider sponsored slots to be personalized recommendations to be engaged with. Since the usefulness of the shadow bid itself is dependent on its comparison with an actual bid of a sponsored piece of content, the higher the tolerance for sponsored pieces of content a user has, the lower the shadow bid should be set.

The position in the ordered list of non-sponsored pieces of content may also be relevant to the value set for the shadow bid. Higher positions, for example, may be assigned higher shadow bids so that sponsored pieces of content need to be even more relevant, or pay even more, to be shown at the top of the display.

The shadow bids may be retrieved from a shadow bid component 216, while the actual bids may be obtained from a bid database 218. The linear programming blending model 210 may then use this information, along with other information, to perform its calculations, again described in more detail later. The online process component 212 then generates a slate of slots based on the output of the linear programming blending model 210.

The linear programming blending model 210 may, in some example embodiment embodiments, consider constraints when making its calculations. In some example embodiments, this is implemented by first generating a slate and then adjusting the slate to satisfy the constraints. In other example embodiments, this is implemented by including the one or more constraints when determining the slate initially.

The one or more constraints may be set to improve user experience. One such constraint may be a maximum number of sponsored pieces of content at the top of the display area (i.e., no more than X sponsored pieces of content may be at the top of the ranking). Another such constraint may be a maximum number of consecutive sponsored pieces of content (i.e., no more than Y sponsored pieces of content consecutively in the ranking). Another such constraint may be a minimum gap between two blocks of sponsored pieces of content. This constraint utilizes another parameter, B, which defines a block size for sponsored pieces of content. Thus, the constraint may indicate that at least X organic pieces of content must appear consecutively after any block of B sponsored pieces of content in the ranking. Another such constraint may be a total maximum number of sponsored pieces of content in a displayed page (of some set number of slots). Another such constraint may be a minimum number of organic pieces of content at the top of the ranking. Another such constraint may be a maximum number of sponsored pieces of content from any one job poster/company per page.

The one or more constraints may be set manually, automatically, or via a combination of the two. For example, a user may select a specific constraint with a specific value for a parameter in the constraint, such as by indicating "no more than 3 sponsored pieces of content at the top of the ranking." Alternatively, the user may select a specific constraint but with a variable for a parameter in the constraint, where the variable may be set via an automatic or dynamic process, or via the use of a machine learning model to predict an appropriate value for the variable, such as if the user indicates "no more than X sponsored pieces of content at the top of the ranking". where X is dynamically or otherwise automatically determined. In some example embodiments, the user may not even select a specific constraint, and a constraint is selected completely via an automatic process, such as using a machine learning model to predict which of a plurality of possible predetermined constraints to apply at runtime.

The constraints may either be global (e.g., apply to all users and contexts), or may be personalized (e.g., one user could have a different constraint than another user).

The slate may then be passed to the content slot filler 220, which uses it to display the actual pieces of content to the user. As mentioned above, the pattern in the slate is used to determine whether a particular slot is going to be assigned to display a sponsored piece of content or an organic piece of content, but not to determine which actual piece of content to display in the slot.

The content slot filler 220 actually fills the assigned slots with content, in accordance with the pattern, but using a ranking that is different than any ranking calculated by the linear programming blending model 210. In an example embodiment, the content slot filler 220 uses the order in the ordered list of sponsored pieces of content from the sponsored content selector 202 to determine which pieces of content to fill the sponsored content slots in the pattern with, and uses the order in the ordered list of non-sponsored pieces of content from the non-sponsored content selector 204 to determine which pieces of content to fill the organic content slots in the pattern with. In some example embodiments, alternative orderings are utilized. For example, the content slot filler 220 may re-rank the organic pieces of content according to its own model.

In an example embodiment, the linear programming blending model 210 uses gradient linear programming methods to solve an objective function. More particularly, in an example embodiment, a Lagrange dual function is solved.

For now, assume that one can enumerate all possible slates for a given impression i: $s_{ir} \in S_i$ (there may be combinatorially many, here s is a slate and S is a set of all possible slates), then the goal is to pick the best slate out of all candidates, one can use an indicator variable for that $x_{ir} \in \{0, 1\}$. However it is practical for computational reasons to replace the indicator variable with $x_{ir} \in [0, 1]$. Real valued solution has probabilistic interpretation: instead of a hard choice one assigns probabilities (sum to 1) to several good variants. In practice the solution will be mostly integer; in case of non-integer solutions one will randomize the allocation according to $x_{ir}$ values.

$$LP: \max_{x_{ir}} \sum_i \sum_r x_{ir} f(s_{ir})$$

$$\text{Subject to: } \sum_i \sum_r x_{ir} g(s_{ir}) \geq R$$

revenue guardrail $$\sum_i \sum_r x_{ir} g_j(s_{ir}) \leq B_j$$

budget constraint for job $j$ $$\sum_i \sum_r x_{ir} h(s_{ir}) \geq A$$

apply guardrail

-continued $$\sum_i \sum_r x_{ir} q(s_{ir}) \geq V$$

views guardrail – recent addition $$\sum_r x_{ir} = 1, x_{ir} \in [0, 1] \forall i$$

select one slate per impression

In this formulation functions f, g, h are just elaborate constants (or constant Matrices) of an LP. Here R is a revenue value, B is a budget value, A is a set number of applies, and V is a set number of views.

As to how to select R and A, the revenue and the apply guardrails, the optimization is solved on historical data, so two variants could be used:

Use realized values of revenue and applies from that day(s), across all job listings.

Compute expected values of R and A based on the realized impressions and displayed jobs, using the pApply (the probability of an apply) and pClick (the probability of a click) models. The pApply model is a machine learned model trained specifically to predict the probability that a particular user will apply to a job based on a particular job listing. The pClick model is a machine learned model trained specifically to predict the probability that a particular user will click on a particular job listing. The benefit of this approach is that it is consistent with the proposed model: it relies on the same pApply and pClick predictions. If the input models are not well calibrated both constraints R, A, V and LP parameters g, h, f, q will have the same bias, that will cancel. The presence of such bias is still unwanted because the budget constraints $B_j$ are true values, not impacted by this bias.

pCTR and pApply predictions can be used as parameters of LP, necessary to estimate expected views and applies. For pCTR, one can use the same model that is currently used for ranking.

As to a pApply model, one possibility is to use the Isotonic Regression pApply model.

The Lagrange Dual Function:

$$F(\lambda, \mu, \nu, \phi) = \max_{\|x_i\|_1 = 1, x_i \geq 0} \sum_i \sum_r x_{ir} f(s_{ir}) + \tag{1}$$
$$\lambda \left( \sum_i \sum_r x_{ir} g(s_{ir}) - R \right) + \mu \left( \sum_i \sum_r x_{ir} h(s_{ir}) - A \right) +$$
$$\phi \left( \sum_i \sum_r x_{ir} q(s_{ir}) - V \right) - \sum_j \nu_j \left( \sum_i \sum_r x_{ir} g_j(s_{ir}) - B_j \right)$$

The Lagrange minimization is:

$$\min_{\lambda, \mu, \nu, \phi \geq 0} F(\lambda, \mu, \nu, \phi) \tag{2}$$

Let $\hat{x}(\lambda, \mu, \nu, \phi)$ be the solution of the maximization problem in (1). And let one assume that the optimal solution of (2): $\{\lambda^*, \mu^*, \nu^*, \phi^*\}$ then $\hat{x}(\lambda^*, \mu^*, \nu^*, \phi^*)$ will be the optimal solution of the original optimization problem.

Solving for the optimal $\{\lambda^*, \mu^*, \nu^*, \phi^*\}$ is exactly what the linear programming blending model 210 is created for: it uses first or second order gradient methods (e.g., gradient descent or LBFGS). To do it one needs to be able to compute function value $F(\lambda, \mu, v, \phi)$ and its gradient $\nabla F(\lambda, \mu, v, \phi)$. Computing $F(\lambda, \mu, v, \phi)$ is equivalent to solving $\hat{x}(\lambda, \mu, v, \phi)$. There is also theory that allows the computation of the gradient $\nabla F(\lambda, \mu, v, \phi)$ if one knows $\hat{x}(\lambda, \mu, v, \phi)$.

To simplify:

First of all notice that maximization does not depend on constants R, A, V, Bj

The expression is the maximization over all requests which one can decompose into the sum of per-request maximizations:

$$\sum_i \max_{x_{ir}} \sum_r x_{ir}\left(f(s_{ir}) + \lambda g(s_{ir}) + \mu h(s_{ir}) + \phi q(s_{ij}) - \sum_j v_j g_j(s_{ir})\right)$$

The expression inside the brackets does not depend on the variable $x_{ir}$. In other word, the following problem is solved:

$$\max_{x_i} \sum_i x_i a_i$$

Subject to: $\sum_i x_i = 1$ and $x_i \geq 0$

The solution to this problem is that one needs to find the largest coefficient $a_i$ and set the corresponding $x_i=1$ and the rest to 0 (in case of the tie the solution is not unique).

As to the internals of a slate, one needs to find the slate s that maximizes the following expression:

$$\max_s f(s) + \lambda g(s) + \mu h(s) + \phi q(s) - \sum_j v_j g_j(s)$$

$\lambda$=revenue adjustment factor, this is 0 for prepaid jobs, and the logic is implemented online $v$=budget adjustment factor $\mu$=applies adjustment factor $\phi$=views adjustment factor One can think of the above expression as the adjusted utility of a slate credited or penalized by the amount it contributes to the constraints. E.g., if the slate contributes a lot to revenue g(s), one credits the utility by $\lambda g(s)$ where dual variable $\lambda$ is the measure of constraint importance. If the constraint is super tight and every dollar of revenue counts then $\lambda$ is high, if the revenue guardrail is trivial to satisfy then $\lambda=0$. On the other hand, if one is getting close to the budget limit of some campaign for job j—then one gets penalized by $v_j g_j(s)$.

In other words, one obtains a formulation where constraints become the part of the objective with weights $\lambda, \mu$, tuned by the LP.

As to online serving, several global coefficients may be pushed, currently $\lambda$, $\mu$ and $\phi$ and per job coefficients $v_j$. Then for each impression one will solve the optimal blending $\hat{x}(\lambda, \mu, v, \phi)$. This is the major building block for offline LP as well as for online serving.

The best slate is the result of solving $\hat{x}(\lambda, \mu, v)$ problem mentioned earlier. This is the main building block for both offline LP solver and online service. Enumeration is not a viable solution because there are combinatorically many slates. Recall that

16

$$f(s) = \sum_k pBias(k)pCTR(j_k)I(j_k \in \text{Promoted})$$

$$g(s) = \sum_k pBias(k)pCTR(j_k)\text{Bid}(j_k)I(j_k \in PPC)$$

revenue constraint, which is only applied to sponsored jobs, so the dual parameter for prepaid is 0 ($\lambda$)

$$g'(s) = \sum_k pBias(k)pCTR(j_k)\text{Bid}(j_k)I(j_k \in \text{Pre-paid})$$

$$h(s) = \sum_k pBias(k)pApply(j_k)$$

$$q(s) = \sum_k pBias(k)pCTR(j_k)$$

new addition

Then the expression that is being maximized is:

$$\sum_k pBias(k)(pCTR(j_k)I(j_k \in \text{Promoted}) +$$

$$(\lambda - v_{jk})pCTR(j_k)\text{Bid}(j_k) + \mu pApply(j_k) + \phi pCTR(j_k)) = \sum_k pBias(k',$$

Above, the expression in large brackets is a constant given job: a combination of chargeable click score, expected payment and expected apply for this job. One can assume that payment is zero for organic jobs.

The original expression may be reduced to a problem of finding the best slate that maximizes the sum of utilities, optimized by position bias. A dynamic programming approach may be utilized to solve the position bias issue. As mentioned above, Position bias is the phenomenon where higher positioned pieces of content are more likely to be seen and thus interacted with, regardless of their actual relevance. A function may be accessed that indicates the relative bias at each position in a ranking, based on, for example, historical click information. This bias may be reflected in a score between 0 and 1 assigned to each position in a ranking, with the score inversely associated with the amount of bias against clicking on a result in that particular ranking spot. In many scenarios that function may be monotonic in the negative direction, meaning that the likelihood that a user clicks on a result decreases with each spot in the ranking (e.g., a user is the same or less likely to click on a result in the second spot as in the first spot, and is also the same or less likely to click on a result in the third spot as in the second spot, etc.). That is not always the case, however, and in some instances a lower ranked spot may actually result in less bias against clicking than a higher ranked spot, such as where the ranking extends over multiple user interface pages such that, for example, the $10^{th}$ spot in the ranking may be at the bottom of the $1^{st}$ page, while the $11^{th}$ spot in the ranking may be at the top of the $2^{nd}$ page.

Nevertheless, the scores produced by the position bias function may be set such that they are able to be utilized as weights applied to the likelihood that a user is others interested in the search result at that position in the ranking. Thus, for example, the first spot in the ranking may have a score of 1.0, with the second spot having a score of 0.9, and the third spot having a score of 0.8.

As to the dynamic programming approach, specifically, the state function at list position L would be the number of sponsored pieces of content and the number of non-sponsored pieces of content already added. The total number of possible states is equal to L. The decision space at each step is binary: either add a next sponsored piece of content or a next non-sponsored piece of content.

A slate may be calculated based on a sum of each piece of content's bid, weighted by position bias, as determined by the (possibly monotonic) position bias function. Thus, the value of this sum may expressed as function slate as follows:

slate(A, B)=sum of weighted bids for positions 0, 1, . . .

(A+B), where A is the number of sponsored pieces of content and B is the number of non-sponsored pieces of content.

Since a slate is dependent on its subset, one can redefine the above expression in terms of its subset as:

$$slate(A,B)=max(slate(A-1,B)+weightedBid(A^{th}\text{ sponsored piece of content}),slate(A,B-1)+weightedBid(B^{th}\text{ non-sponsored piece of content})$$

where weightedBid(jk)=pBias(jk)*Bid(jk).

In an example embodiment, this method may be presented as the building of a matric using a number of different constraints. The cells in the matrix contain context information used to build future cells. The following pseudocode is an example of such an implementation, for job listings:

```
protected LPSlateContext generaeteBestSlate(List<RankedJob>sponsored jobs
    List<RankedJob> non-sponsoredJobs, int pinnedJobsSize, ViewerExperiments
experiments,
    Map<JobPostingUrn, LpJobBlendingModelParameters>
blendingModelParametersMap, List<Double> positionBiases) {
        // Constraint params
        DynamicSlottingLixParameters lixParameters =
experiments.getDynamicSlottingLixParameters( );
        // Maximum number of sponsored slots should be min of constraint or size of
sponsoredJobs list
        int maxNumSponsoredSlots =
Math.min(lixParameters.getMaxNumSponsoredSlots( ), sponsoredJobs.size( ));
        // pinned jobs also contribute to the minTopNon-sponsored constraints
        int minTopNon-sponsored = getNewMinTopNon-
sponsored(lixParameters.getMinTopNon-sponsoredSlots( ), pinnedJobsSize);
    minTopNon-sponsored = Math.min(minTopNon-sponsored, non-
sponsoredJobs.size( ));
        int maxConsecutiveSponsored =
Math.min(lixParameters.getMaxConsecutiveSponsoredSlots( ),
maxNumSponsoredSlots);
        // Bind top sponsored section to also respect the max consecutive sponsored
constraint
        int maxTopSponsored =
Math.min(Math.min(lixParameters.getMaxTopSponsoredSlots( ),
maxConsecutiveSponsored), maxNumSponsoredSlots);
        // Use hashmap to cache lp scores for every ranked job
        Map<RankedJob, Double> lpScoresMap = non-sponsoredJobs.stream( )
        .collect(Collectors.toMap(Function.identity( ), rankedJob ->
calculateLpScore(rankedJob, blendingModelParametersMap)));
    lpScoresMap.putAll(sponsoredJobs.stream( ).limit(maxNumSponsoredSlots) // No
need to calculate past maxNumSponsoredSlots
        .collect(Collectors.toMap(Function.identity( ), rankedJob ->
calculateLpScore(rankedJob, blendingModelParametersMap))));
        // Initialize state matrix to keep track of context for every possible enumeration of
numSponsored and numNon-sponsored
        // Note that size is numSponsored + 1 because 0 is a valid option (0, 1, 2,. ..
numSponsored)
        LpSlateContext[ ][ ] slateMatrix = new LpSlateContext[maxNumSponsoredSlots
+ 1][non-sponsoredJobs.size( ) + 1];
        // Fill (0,0) with default value
    slateMatrix[0][0] = new LpSlateContext(null, 0, null);
        // Fill first row with default values if we only chose non-sponsored jobs. This will
also guarantee that we will always
        // have an answer in the bottom right most cell.
        for (int numNon-sponsored = 1; numNon-sponsored <= non-
sponsoredJobs.size( ); numNon-sponsored++) {
    RankedJob rankedJob = non-sponsoredJobs.get(numNon-sponsored - 1);
    LpSlateContext lpSlateContext = createLpSlateContext(slateMatrix, rankedJob,
0, numNon-sponsored - 1,
    positionBiases, lpScoresMap);
    slateMatrix[0][numNon-sponsored] = lpSlateContext;
    }
        /*
    Fill first valid column with default values if we only chose sponsored jobs
    The first valid column is slateMatrix[A][minTopNon-sponsored].
    If min TopNon-sponsored > 0, fill with sponsored jobs until
maxConsecutiveSponsored is reached.
    This is the case where we begin a list with minTopNon-sponsored number of non-
sponsored jobs.
    If min TopNon-sponsored is 0, fill with sponsored jobs until maxTopSponsored is
reached.
```

-continued

```
This is the case where we begin a list with sponsored jobs.
Ceiling for either scenario will be maxNumSponsoredSlots.
*/
    int maxSponsoredInFirstValidRow = Math.min(minTopNon-sponsored > 0 ?
maxConsecutiveSponsored : maxTopSponsored, maxNumSponsoredSlots);
    /*
 * In this edge case, there are no more non-sponsored jobs left after minTopNon-
sponsored has been set. Therefore in this scenario,
 * we ignore the maxTopSponsored/maxConsecutiveSponsored values in order to
fill the rest of the slate with sponsored
 * slots. This way, slateMatrix[maxNumSponsoredSlots][non-sponsoredJobs.size( )]
will not be null.
 *
 * For example, if non-sponsoredJobs = [jobA], sponsoredJobs = [jobB, jobC,
jobD] and minTopNon-sponsored = 2, maxConsecutiveSponsored = 1,
 * we want the final slate to look like [O, P, P, P] instead of [O, P]
 */
    if (minTopNon-sponsored == non-sponsoredJobs.size( )) {
    maxSponsoredInFirstValidRow = maxNumSponsoredSlots;
}
    for (int numSponsored = 1; numSponsored <= maxSponsoredInFirstValidRow;
numSponsored++) {
    RankedJob rankedJob = sponsoredJobs.get(numSponsored − 1);
    LpSlateContext lpSlateContext = createLpSlateContext(slateMatrix, rankedJob,
numSponsored − 1, minTopNon-sponsored,
    positionBiases, lpScoresMap);
    slateMatrix[numSponsored][minTopNon-sponsored] = lpSlateContext;
}
    /*
Using previously filled cells, populate the table from bottom up.
To determine how to populate, we evaluate:
slate(numSponsored, numNon-sponsored) = max(slate(numSponsored − 1, non-
sponsoredJobIdx) + weightedAuctionScore(sponsoredJobIdx)
, slate(numSponsored, numNon-sponsored−1) + weightedAuctionScore(non-
sponsoredJobIdx))
Start populating from the first valid cell. For example, let's say we have the
following constraints:
maxNumSponsoredSlots = 4
numNon-sponsored = 4
minTopNon-sponsored = 2
maxConsecutiveSponsored = 2
The slate matrix will be filled as follows (where X = filled, * = starting position)
[[X] [X] [X] [X] [X]]
[[ ] [ ] [X] [*] [ ]]
[[ ] [ ] [X] [ ] [ ]]
[[ ] [ ] [ ] [ ] [ ]]
[[ ] [ ] [ ] [ ] [ ]]
```

Since the first 2 must be non-sponsored, the first 2 columns should not be filled in. Instead, start with slateMatrix[1][3]

Therefore, cells that are empty, i.e., null, denote combinations that are not possible and should not be built upon by future cells.

Figure 3:
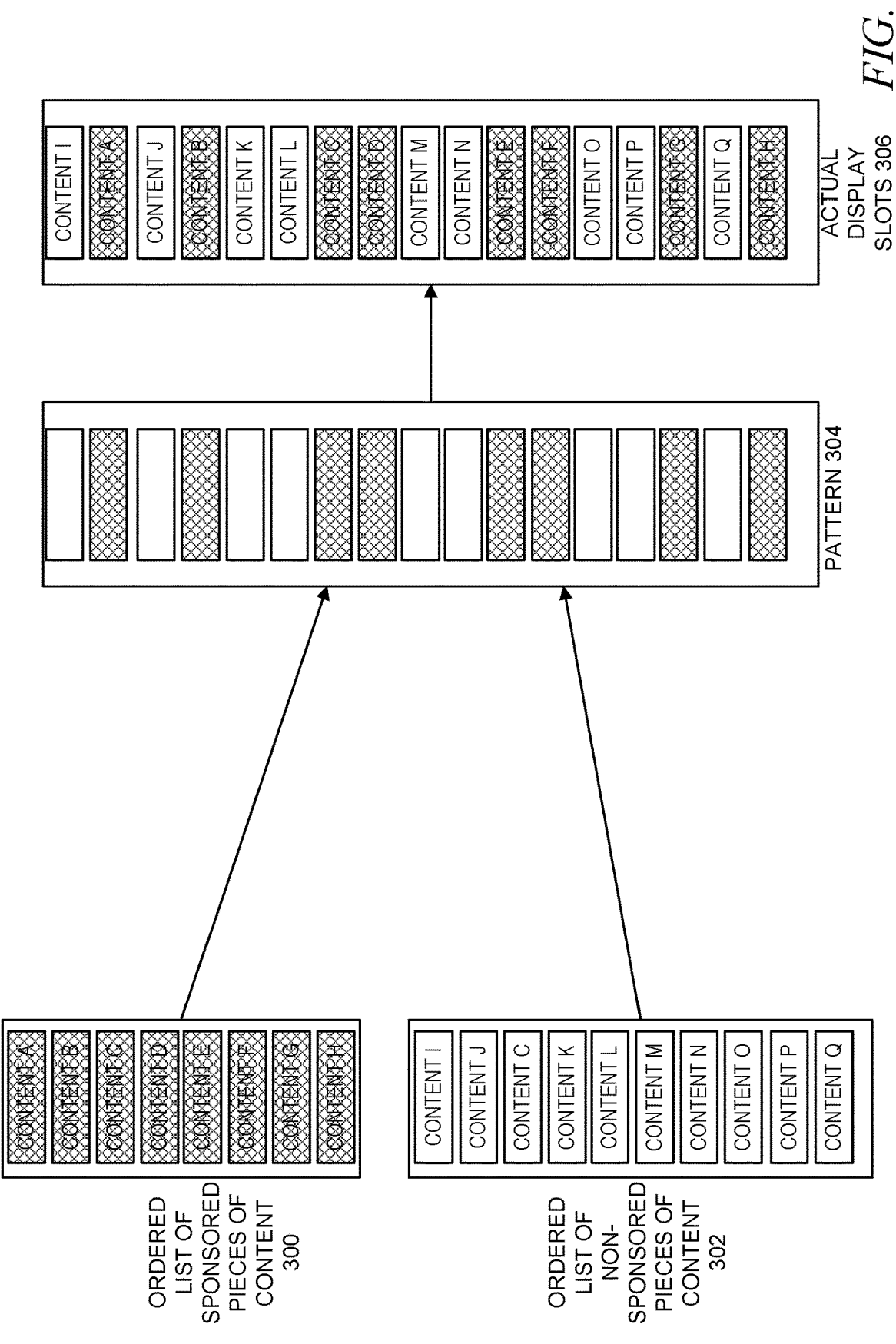
FIG. 3 is a diagram illustrating an example of dynamic slotting, in accordance with an example embodiment.

FIG. 3 is a diagram illustrating an example of dynamic slotting, in accordance with an example embodiment. The ordered list of sponsored pieces of content 300 includes eight sponsored pieces of content in a first order, while the ordered list of non-sponsored pieces of content 302 includes ten non-sponsored pieces of content in a second order. The sponsored pieces of content are shaded, while the non-

```
*/
    for (int numSponsored = 1; numSponsored <= maxNumSponsoredSlots;
numSponsored++) {
    for (int numNon-sponsored = minTopNon-sponsored + 1; numNon-sponsored <=
non-sponsoredJobs.size( ); numNon-sponsored++) {
    RankedJob sponsoredJob = sponsoredJobs.get(numSponsored − 1);
    RankedJob non-sponsoredJob = non-sponsoredJobs.get(numNon-sponsored − 1);
    slateMatrix[numSponsored][numNon-sponsored] = getSlateWithHigherScore(
        createLpSlateContext(slateMatrix, sponsoredJob, numSponsored − 1, numNon-
sponsored, positionBiases, lpScoresMap),
        createLpSlateContext(slateMatrix, non-sponsoredJob, numSponsored, numNon-
sponsored − 1, positionBiases, lpScoresMap)
    );
    }
}
    // Optimum answer lies in the bottom right most cell
    return slateMatrix[maxNumSponsoredSlots][non-sponsoredJobs.size( )];
``` sponsored pieces of content are not. Notably, there is one piece of content (Content C) that is present in both lists. This duplicate piece of content may be removed from the ordered list of non-sponsored pieces of content 302, leaving nine non-sponsored pieces of content. The slate 304 is then determined by using the offline and online process described above, using a linear programming blending model. The original ordering in the ordered list of sponsored pieces of content 300 and the original ordering in the ordered list of non-sponsored pieces of content 302 is then used to fill in actual display slots 306 (subject to an upper limit on the number of slots that can be displayed at any one time, based on the device or device class being used, for example). Example device classes include web browser, desktop application, and mobile application.

As described earlier, the linear programming blending model 210 may make its calculations subject to one or more constraints. In an example embodiment, the constraints may be applied using a finite state machine. More particularly, when there is more than one constraint, the ordering of how the constraints are applied may affect the results of the ranking, and thus the final pattern. In an example embodiment, the following constraints may be utilized: (1) maximum number of sponsored pieces of content at the top of the display area; (2) maximum number of sponsored pieces of content from any one job poster/company per page; (3) minimum number of non-sponsored pieces of content at the top of the display area; (4) maximum number of consecutive sponsored pieces of content; and (5) minimum gap between two blocks of sponsored pieces of content. The constraints may be applied in the order from (1) to (5), although (3)-(5) do not potentially conflict with each other and thus could be applied in any order amongst themselves.

In a finite state machine, a state is a description of the status of a system that is waiting to execute a transition. A transition is a set of actions to be executed when a condition is fulfilled or when an event is received. In some finite state machine representations, it is also possible to associate actions with a state.

In an example embodiment, the event triggering the transition is a need to determine a next slot in the pattern with a piece of content from the ordered list of sponsored pieces of content and the ordered list of non-sponsored pieces of content. When there is only one piece of content left, either non-sponsored or sponsored, the next state will be the end state, in which case the remaining piece of content is simply appended to the slate.

Figure 4:
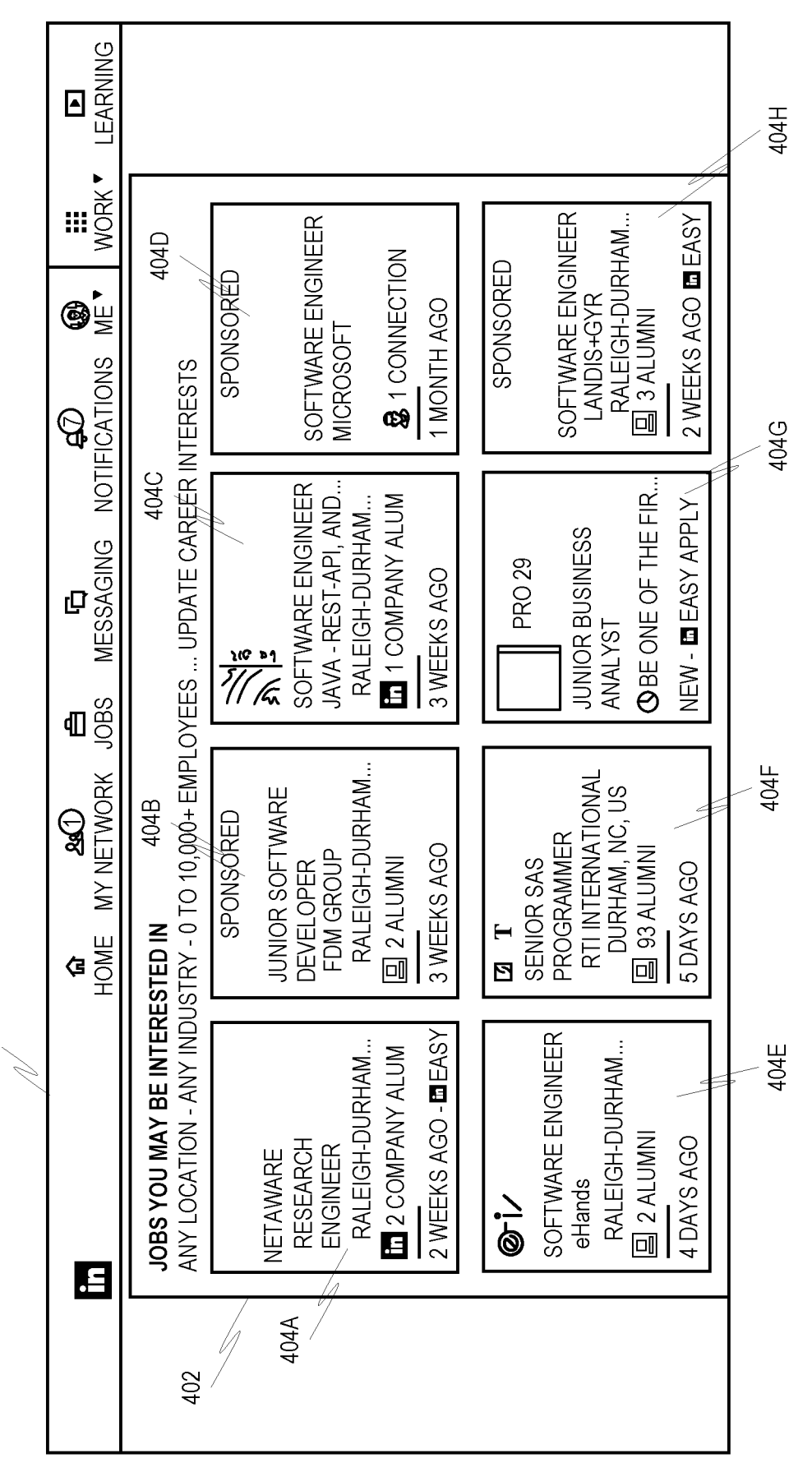
FIG. 4 is a diagram illustrating a screen capture of a job listing user interface in accordance with an example embodiment.

FIG. 4 is a diagram illustrating a screen capture of a job listing user interface 400 in accordance with an example embodiment. Here, the user interface 400 is a web page presented in a web browser. The job listing user interface 400 includes a portion 402 set aside where recommended job listings are presented. The job listing user interface 400 is part of the jobs-you-may-be-interested-in channel. Here, there are spaces for eight job listings per page, and the pattern has indicated that the $2^{nd}$, $4^{th}$, and $8^{th}$ slots (as read left-to-right and then top-to-bottom) are sponsored slots. As such, the job listings 404B, 404D, and 404H are sponsored job listings, while the remaining job listings 404A, 404C, 404E, 404F, and 404G are non-sponsored job listings.

It should be noted that FIG. 4 is merely one example of a job listing user interface 400, and the design and layout of the job listing user interface 400 may vary greatly from implementation to implementation. More particularly, the number and layout of the presented job listings may also vary. Furthermore, in some example embodiments, rather than having the job listings presented in strictly defined pages, they are presented using an infinite scrolling technique, where a user can see more and more listings by scrolling down in the display rather than needing to skip to a separate page of listings. The techniques described above would be equally applicable to the infinite scrolling embodiment, with the exception that constraints tied to pages would need to be reformulated so that the entirety of the job listings are considered as one large page.

In another example embodiment, the job listing user interface 400 may be presented on a mobile device, either in a web browser operating on the mobile device or in a stand-alone application ("app"). Notably, mobile devices often have more limited screen space, and thus the number of listings presented on any one page of the user interface may need to be more limited than in a more traditional job listing user interface intended for display on a desktop or laptop device. The determination of the pattern in such embodiments may be at least partially dependent on the fact that the job listing user interface 400 will be displayed on a mobile device (i.e., the pattern may be different if the job listing user interface 400 is displayed on a desktop or laptop device). In some example embodiments, the size of the display may be dynamically determined at the time the pattern is being determined, to allow the pattern to be customized to the size of the display.

FIG. 5 is a flow diagram illustrating a method 500 of displaying pieces of content in a graphical user interface, in accordance with an example embodiment. Operations 502-504 occur during an offline mode, such as performed periodically once a day. At operation 502, a plurality of sponsored pieces of content and a plurality of non-sponsored pieces of content are obtained from a database. In some example embodiment, these pluralities may together represent all pieces of content of a particular type (e.g., job listings) in the database. At operation 504, one or more parameters are generated by executing a linear programming blending model on the plurality of sponsored pieces of content and the plurality of non-sponsored pieces of content. The linear programming blending model calculates a first slate of sponsored and non-sponsored pieces of content, the first slate maximizing an objective function. Notably, however, this first slate is not utilized, beyond being a way to calculate the parameters that will later be used in an online mode to calculate a second slate.

Operations 506-518 occur during an online mode, such as when a list of content items to display to a user is generated (e.g., when the user explicitly requests such a list, such as via a search, or when a system determines such a user should be sent such a list, such as when generating an alert or feed for the user.

At operation 506, a first ordered list of sponsored pieces of content is obtained. This first ordered list may be based on a relevancy score for each of a plurality of sponsored pieces of content, as produced by a sponsored relevancy model. It should be noted that in some cases all available sponsored pieces of content may be included in the first ordered list, but in other cases a subset of available sponsored pieces of content may be included in the list, such as ones that meet some minimum qualification or qualifications (e.g., if the user specified certain conditions in an explicit search, such as only showing job listings within 100 miles of their location).

At operation 508, a second ordered list of non-sponsored pieces of content is obtained. This second ordered list may be based on a relevancy score for each of a plurality of non-sponsored pieces of content, as produced by a non-sponsored relevancy model. As with the first ordered list, in some cases all available non-sponsored pieces of content may be included in the second ordered list, but in other cases a subset of available non-sponsored pieces of content may be included in the list.

At operation 510, position bias scores for all the possible slots are determined based on a position bias function. At operation 512, the linear programming blending model is executed is on pieces of content from the first ordered list of sponsored pieces of content and the second ordered list of non-sponsored pieces of content, using the parameters generated during the online mode and the position bias scores. Here, the linear programming blending model calculates a second slate of sponsored pieces of content and non-sponsored pieces of content, the second slate maximizing the objective function. It should be noted that the linear programming blending model may here have access to additional information not available when it was executed in the offline mode, most notably user information regarding a user to whom the pieces of content in the first and second ordered lists are being considered for display.

At operation 514, a pattern for display of pieces of content is created by indicating, at each slot in the second slate, whether the corresponding piece of content in the ranking is sponsored or non-sponsored. At operation 516, one or more sponsored pieces of content from the first list is assigned to slots in the pattern that have been identified as sponsored. At operation 518, one or more non-sponsored pieces of content from the second list is assigned to slots in the pattern that have been identified as non-sponsored. At operation 520, a system causes display, in a graphical user interface, of the assigned one or more sponsored pieces of content and the assigned one or more non-sponsored pieces of content in the slots in the pattern in which they have been assigned.

Figure 6:
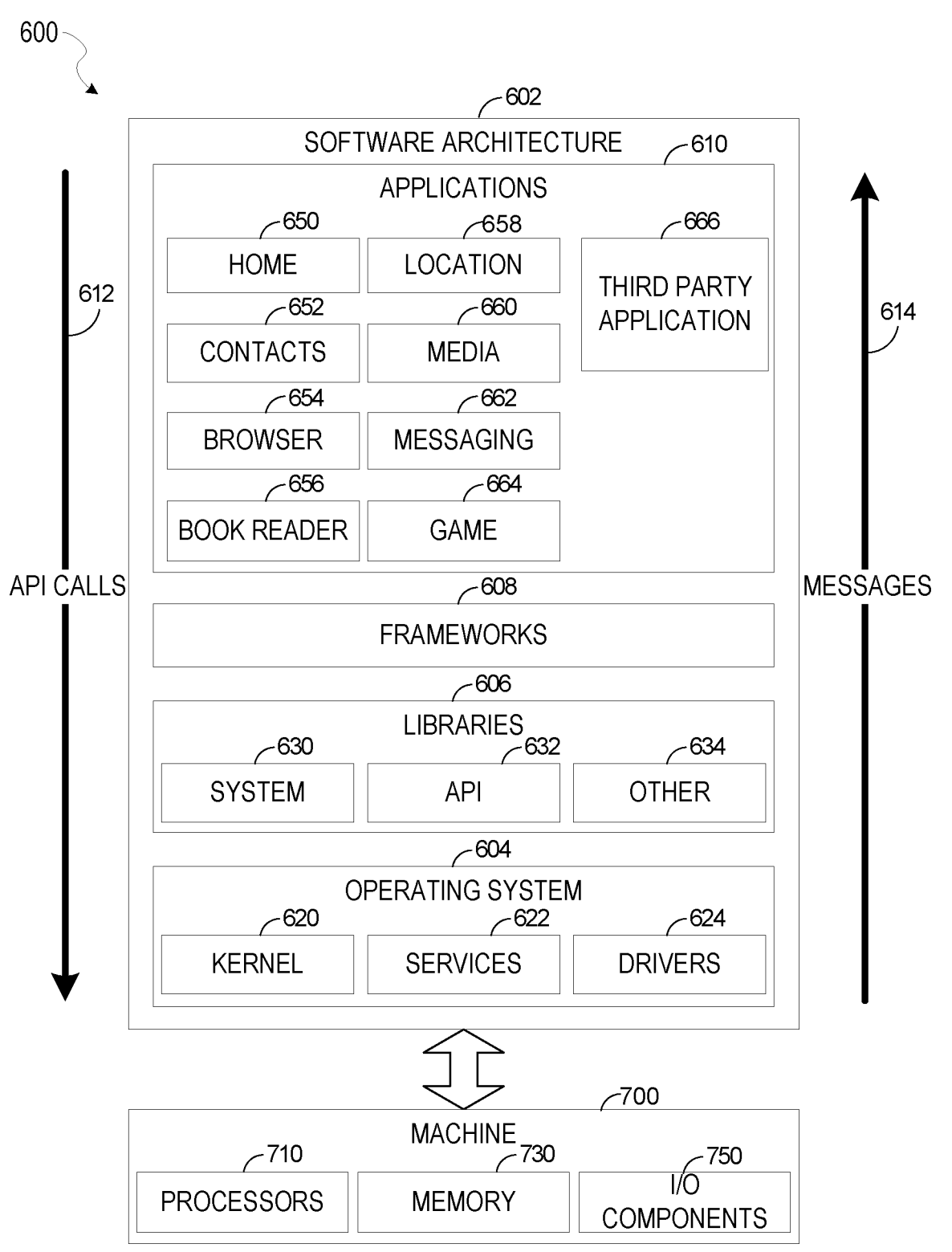
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
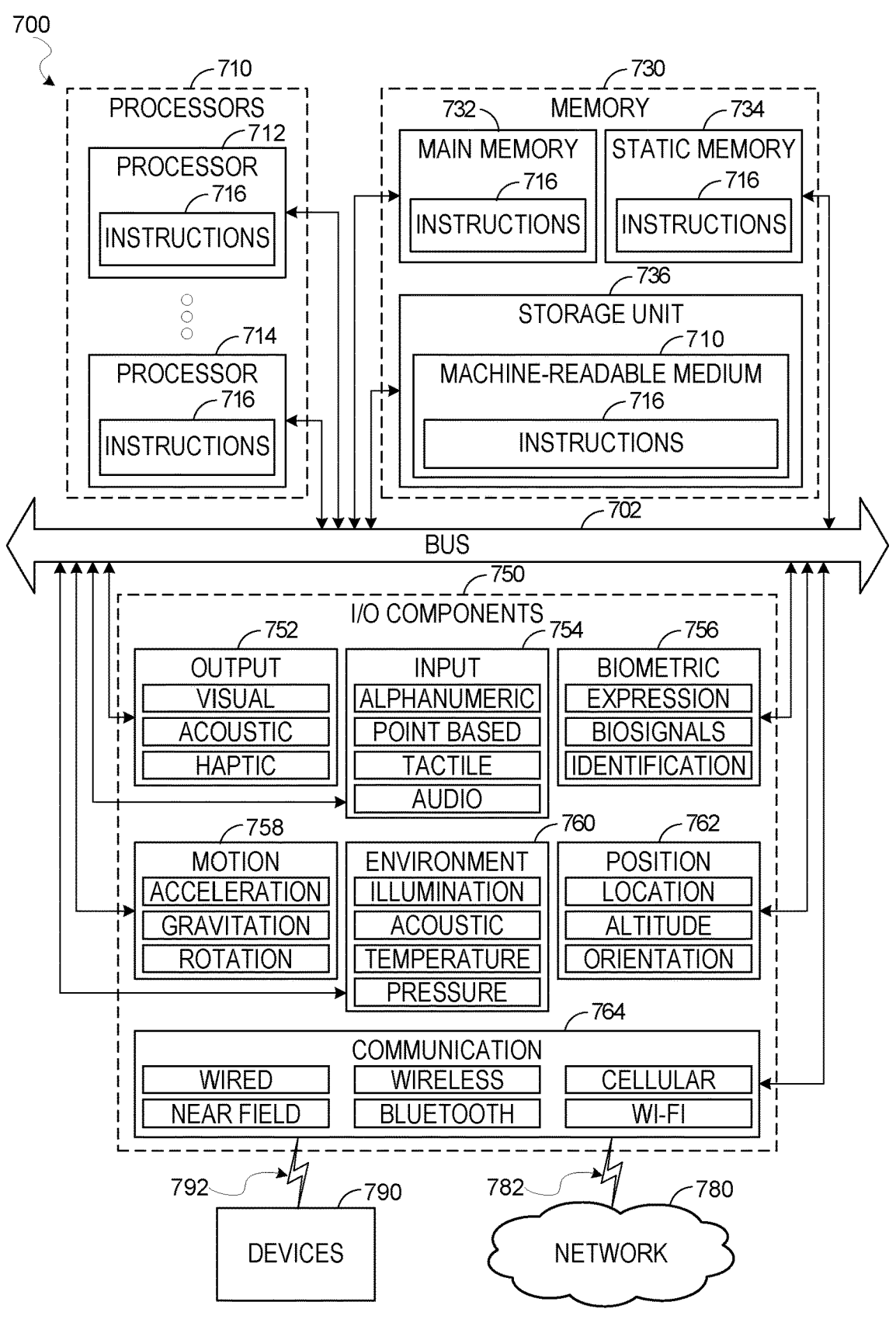
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 500 of FIG. 5. Additionally, or alternatively, the instructions 716 may implement FIGS. 1-5, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 790 via a coupling 782 and a coupling 792, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 790 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 792 (e.g., a peer-to-peer coupling) to the devices 790. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

a computer-readable medium having instructions stored thereon, which, when executed by a processor, cause the system to perform operations comprising:

in an offline mode:

generate one or more parameters by executing a linear programming blending model on a plurality of sponsored pieces of content and a plurality of non-sponsored pieces of content, the linear programming blending model calculating a first slate of sponsored and non-sponsored pieces of content, the first slate maximizing an objective function subject to a guardrail, wherein a guardrail is a metric whose value cannot drop below a preset value in the first slate;

in an online mode:

generate a first ordered list of sponsored pieces of content using a sponsored relevance model and a second ordered list of non-sponsored pieces of content using a non-sponsored relevance model, wherein the sponsored relevance model and the non-sponsored relevance model are machine learning (ML) models using a set of features comprising information about a user, a display channel, or a piece of content;

execute the linear programming blending model on pieces of content from the first ordered list of sponsored pieces of content and the second ordered list of non-sponsored pieces of content, using the one or more parameters generated during the offline mode and a parameter generated during the online mode, the linear programming blending model calculating a second slate of sponsored pieces of content and non-sponsored pieces of content, the second slate maximizing the objective function;

create a pattern for display of pieces of content by indicating, at each slot in the second slate, whether a corresponding piece of content in the second slate is sponsored or non-sponsored;

assign one or more sponsored pieces of content from the first ordered list to slots in the pattern that have been identified as sponsored and one or more non-sponsored pieces of content from the second ordered list to slots in the pattern that have been identified as non-sponsored; and cause display, in a graphical user interface, of the assigned one or more sponsored pieces of content and the assigned one or more non-sponsored pieces of content in the slots in the pattern in which they have been assigned.

2. The system of claim 1, wherein the operations further comprise:

determine position bias scores for a plurality of possible slots based on a position bias function; and wherein the executing is additionally performed using the determined position bias scores.

3. The system of claim 1, wherein the linear programming model implements a Lagrange dual function.

4. The system of claim 1, wherein the guardrail is total revenue.

5. The system of claim 1, wherein the guardrail is overall views.

6. The system of claim 1, wherein the pieces of content are job listings and the one or more guardrails include a number of applies to jobs corresponding to the job listings.

7. The system of claim 1, wherein the linear programming blending model takes as input a bid for each piece of content.

8. The system of claim 7, wherein for sponsored pieces of content the bid is an amount a content poster has agreed to pay for an impression of the corresponding sponsored piece of content.

9. The system of claim 7, wherein for non-sponsored pieces of content the bid is a shadow bid indicative of a hypothetical value of an impression of the corresponding non-sponsored piece of content.

10. The system of claim 1, wherein the second slate includes a pattern in accordance with one or more constraints on placement locations for sponsored and/or non-sponsored pieces of content.

11. The system of claim 10, wherein the one or more constraints include a maximum number of consecutive sponsored pieces of content beginning at a highest slot of a display area.

12. The system of claim 10, wherein the one or more constraints include a maximum number of consecutive sponsored pieces of content.

13. The system of claim 10, wherein the one or more constraints include a minimum gap between two blocks of a set block size number of sponsored pieces of content.

14. The system of claim 10, wherein the one or more constraints include a total maximum number of sponsored pieces of content in a displayed page.

15. The system of claim 10, wherein the one or more constraints include a minimum number of consecutive non-sponsored pieces of content beginning at a highest slot of a display area.

16. The system of claim 10, wherein the one or more constraints include a maximum number of sponsored pieces of content from any one job poster or company per page.

17. The system of claim 1, wherein the pattern is dependent on a device on which the graphical user interface is rendered.

18. A computerized method comprising:

in an offline mode:

generating one or more parameters by executing a linear programming blending model on a plurality of sponsored pieces of content and a plurality of non-sponsored pieces of content, the linear programming blending model calculating a first slate of sponsored and non-sponsored pieces of content, the first slate maximizing an objective function subject to a guardrail, wherein a guardrail is a metric whose value cannot drop below a preset value in the first slate;

in an online mode:

generating a first ordered list of sponsored pieces of content using a sponsored relevance model and a second ordered list of non-sponsored pieces of content using a non-sponsored relevance model, wherein the sponsored relevance model and the non-sponsored relevance model are machine learning (ML) models using a set of features comprising information about a user, a display channel, or a piece of content;

executing the linear programming blending model on pieces of content from the first ordered list of sponsored pieces of content and the second ordered list of non-sponsored pieces of content, using the one or more parameters generated during the offline mode and a parameter generated during the online mode, the linear programming blending model calculating a second slate of sponsored pieces of content and non-sponsored pieces of content, the second slate maximizing the objective function;

creating a pattern for display of pieces of content by indicating, at each slot in the second slate, whether a corresponding piece of content in the second slate is sponsored or non-sponsored;

assigning one or more sponsored pieces of content from the first ordered list to slots in the pattern that have been identified as sponsored and one or more non-sponsored pieces of content from the second ordered list to slots in the pattern that have been identified as non-sponsored; and causing display, in a graphical user interface, of the assigned one or more sponsored pieces of content and the assigned one or more non-sponsored pieces of content in the slots in the pattern in which they have been assigned.

19. A system comprising:

means for, in an offline mode:

generating one or more parameters by executing a linear programming blending model on a plurality of sponsored pieces of content and a plurality of non-sponsored pieces of content, the linear programming blending model calculating a first slate of sponsored and non-sponsored pieces of content, the first slate maximizing an objective function subject to a guard-rail, wherein a guardrail is a metric whose value cannot drop below a preset value in the first slate;

means for, in an online mode:

generating a first ordered list of sponsored pieces of content using a sponsored relevance model and a second ordered list of non-sponsored pieces of content using a non-sponsored relevance model, wherein the sponsored relevance model and the non-sponsored relevance model are machine learning (ML) models using a set of features comprising information about a user, a display channel, or a piece of content;

executing the linear programming blending model on pieces of content from a first ordered list of sponsored pieces of content and a second ordered list of non-sponsored pieces of content, using the one or more parameters generated during the offline mode and a parameter generated during the online mode, the linear programming blending model calculating a second slate of sponsored pieces of content and non-sponsored pieces of content, the second slate maximizing the objective function;

creating a pattern for display of pieces of content by indicating, at each slot in the second slate, whether a corresponding piece of content in the second slate is sponsored or non-sponsored;

assigning one or more sponsored pieces of content from the first ordered list to slots in the pattern that have been identified as sponsored and one or more non-sponsored pieces of content from the second ordered list to slots in the pattern that have been identified as non-sponsored; and causing display, in a graphical user interface, of the assigned one or more sponsored pieces of content and the assigned one or more non-sponsored pieces of content in the slots in the pattern in which they have been assigned.

* * * * *